United States Patent
Kim et al.

(10) Patent No.: US 8,767,692 B2
(45) Date of Patent: Jul. 1, 2014

(54) COMMUNICATION METHOD IN AN IEEE 802.11 WIRELESS LAN ENVIRONMENT

(75) Inventors: Jong Won Kim, Gwangju (KR); Ha Young Yoon, Gwangju (KR)

(73) Assignee: ITEC Tokyo Corporation, Tokyo (JP)

( * ) Notice: Subject to any disclaimer, the term of this patent is extended or adjusted under 35 U.S.C. 154(b) by 212 days.

(21) Appl. No.: 13/264,327

(22) PCT Filed: Feb. 25, 2010

(86) PCT No.: PCT/KR2010/001202
§ 371 (c)(1),
(2), (4) Date: Oct. 13, 2011

(87) PCT Pub. No.: WO2010/120040
PCT Pub. Date: Oct. 21, 2010

(65) Prior Publication Data
US 2012/0051350 A1 Mar. 1, 2012

(30) Foreign Application Priority Data

Apr. 15, 2009 (KR) .................. 10-2009-0032945
Jun. 8, 2009 (KR) .................. 10-2009-0050420
Sep. 21, 2009 (KR) .................. 10-2009-0089230

(51) Int. Cl.
*H04W 4/00* (2009.01)
*H04L 12/54* (2013.01)
*H04W 84/12* (2009.01)
*H04W 84/02* (2009.01)
*H04W 80/04* (2009.01)
*H04L 12/56* (2006.01)

(52) U.S. Cl.
CPC .............. *H04W 84/12* (2013.01); *H04W 84/02* (2013.01); *H04W 80/04* (2013.01); *H04L 49/90* (2013.01)
USPC ............................ 370/338; 370/328; 370/429

(58) Field of Classification Search
None
See application file for complete search history.

(56) References Cited

U.S. PATENT DOCUMENTS

2004/0246934 A1* 12/2004 Kim .............................. 370/338
2005/0226183 A1 10/2005 Penumetsa
(Continued)

FOREIGN PATENT DOCUMENTS

| JP | 2007-295541 | 8/2007 |
|---|---|---|
| JP | 2009-515477 A | 4/2009 |

(Continued)

OTHER PUBLICATIONS

Yoon, H., Kim, J., and Hsieh, R.; "iDLS: Inter-BSS Direct Link Setup in IEEE 802.11 WLANs", IEEE 2007 ISCIT, Oct. 17-19, 2007, pp. 1-6.

*Primary Examiner* — Kevin C Harper
*Assistant Examiner* — Peter Chen
(74) *Attorney, Agent, or Firm* — Senniger Powers LLP

(57) ABSTRACT

A communication method in an IEEE 802.11 wireless LAN environment comprises: in the event that traffic from a station targeting another station as a destination is generated in the station, negotiating with another station for directly establishing a link to a secondary wireless channel other than the basic service set (BSS) channel used for communication with an access point (AP); if the negotiation has succeeded, and the link to the secondary channel is to be directly established, switching the operating channel of the station from the BSS channel to the secondary channel; and transmitting data of the generated traffic to said other station through the secondary channel. The method enables communication between the station and the AP, and the direct establishment of links between stations using multiple channels in an IEEE 802.11 wireless LAN environment.

6 Claims, 16 Drawing Sheets

(56) References Cited

U.S. PATENT DOCUMENTS

| | | | |
|---|---|---|---|
| 2006/0120334 A1* | 6/2006 | Wang et al. | 370/338 |
| 2006/0291439 A1 | 12/2006 | Yang et al. | |
| 2007/0008922 A1* | 1/2007 | Abhishek et al. | 370/329 |
| 2007/0014302 A1 | 1/2007 | Vincent | |
| 2007/0097934 A1* | 5/2007 | Walker et al. | 370/338 |
| 2007/0104138 A1* | 5/2007 | Rudolf et al. | 370/329 |
| 2007/0184864 A1 | 8/2007 | Leitch et al. | |
| 2007/0230423 A1* | 10/2007 | Yoshida et al. | 370/338 |
| 2007/0268862 A1* | 11/2007 | Singh et al. | 370/329 |
| 2008/0025233 A1* | 1/2008 | Otsuka | 370/254 |
| 2008/0186901 A1* | 8/2008 | Itagaki et al. | 370/315 |
| 2008/0259940 A1 | 10/2008 | George et al. | |
| 2009/0022125 A1* | 1/2009 | Seok | 370/338 |
| 2009/0046570 A1 | 2/2009 | Sarkar et al. | |
| 2009/0231995 A1* | 9/2009 | Chu et al. | 370/225 |

FOREIGN PATENT DOCUMENTS

| | | |
|---|---|---|
| KR | 10-2008-0070740 A | 7/2008 |
| WO | 2005050919 A2 | 6/2005 |

\* cited by examiner

COMMUNICATION METHOD IN AN IEEE 802.11 WIRELESS LAN ENVIRONMENT

TECHNICAL FIELD

The present invention relates to an IEEE 802.11 WLAN, and more particularly, to an inter-station communication method and a WLAN station in an IEEE 802.11 WLAN environment.

BACKGROUND ART

With the development of communication technologies, various methods for wireless communication have been used so as to overcome inconvenience of wired communication always requiring lines at the time of communication Among those, an IEEE (Institute of Electrical and Electronic Engineers) 802.11 based WLAN has been in the limelight recently.

Provided that all the stations belonging to BSS are established with a single channel (BSS channel) for communicating with an access point (AP) in IEEE 802.11 standard [IEEE 802.11 WC, Part 11 Wireless LAN MAC and PHY specification, IEEE Standard, August 1999.], all the traffics generated from a station (STA) are transmitted to destinations via the AP. Herein, the basic service set (BSS) means a set of stations communicating through any one channel and the WLAN may perform the communication in one BSS unit. The station, which is a member of one BSS, means an apparatus that can perform the wireless communication. In the IEEE 802.11 standard, an inter-station distance sufficiently approximates each other, but twice transmission from a transmitting station to the AP and from the AP to a receiving station is performed in the case of the inter-station traffic generated in the BSS, such that the wireless channel resources may be wasted twice.

In order to overcome the inefficiency and directly perform the transmission of the inter-station traffic within the BSS, the IEEE 802.11e standard [IEEE 802.11e WG, Part 11: IEEE Standard for Information technology Telecommunications and information exchange between systems Local and metropolitan area networks Specific requirements Part 11: Wireless LAN Medium Access Control (MAC) and Physical Layer (PHY) specifications Amendment 8: Medium Access Control (MAC) Quality of Service Enhancements.] defines a direct link setup. The DLS defined herein, which is a subject a QAP (QoS-enabled AP), sets an inter-station direct link call setup and then, directly transmit and receive the traffic generated for a predetermined time between two stations, thereby increasing the efficiency the wireless channel resources twice.

However, the DLS defined in the IEEE 802.11e required new functionality for the AP, such that the replacement of the existing distributed APs is was needed. This was not welcomed in the market, and several years after the standard was established, WLAN equipment manufacturers were still not using the DLS. Therefore, methods of allowing the final stations to set the direct link other than the method of setting the inter-station direct link using the QAP according to the related art have been proposed. One of the methods is disclosed in H. Yoon, J W Kim and R Hsieh, "iDLS Inter-BSS direct link setup in IEEE 602.11 WLANs," Communications and Information Technologies, 2007 ISCIT '07 International Symposium on, vol., no., pp. 1015-1020, 17-19 Oct. 2007.

DISCLOSURE

Technical Problem

The present invention has been made in an effort to provide an inter-station communication method using multi channels in IEEE 802.11 WLAN environment.

Further, the present invention has been made in an effort to provide a direct link setup method and a WLAN station capable of communicating between stations and APs using a multi-channel in the IEEE 802.11 WLAN environment and setting an inter-station direct link.

In addition, the present invention has been made in an effort to provide a multicast method in IEEE 802.11 WLAN environment.

Technical Solution

An exemplary embodiment of the present invention provides a method for setting a direct link in the IEEE 802.11 WLAN environment, including: (a) performing a negotiation for setting a direct link by a wireless channel, a secondary channel other than a basic service set (BSS) channel used for communicating with an access point (AP), with the other station, when a traffic destined to the other station is generated in a station; (b) switching an operation channel of the station from the BSS channel to the secondary channel when the negotiation for setting the direct link by the secondary channel succeeds according to the negotiation performance results; and (c) transmitting data of the generated traffic to the other station through the secondary channel.

The step (a) may include: transmitting a direct link setup request including information on the secondary channel to the other station via the AP; and transmitting ACK to the other station via the AP when the direct link setup response is received via the AP from the other station.

The method may further include transmitting the data of the generated traffic to the other station via the BSS channel if the negotiation for setting the direct link by the BSS channel succeeds according to the negotiation performance result.

The method may further include: (d) releasing the direct link setup from the other station when the traffic destined to the AP is generated in the station after step (c); (e) switching the operation channel of the station from the secondary channel to the BSS channel; and (f) transmitting the data of the generated traffic to the AP through the BSS channel.

The step (d) may include: transmitting the direct link release request to the other station; and receiving the ACK from the other station.

The method may further include performing the negotiation for setting the direct link only by the BSS channel with the other station in the case in which the traffic destined to the other station is generated at the time when the predetermined time does not lapses from the time when the data are finally transmitted and received to and from the AP after the step (e).

The method may further include: performing the negotiation for setting the direct link by the secondary channel with the other station when the traffic destined to the other station is generated after the predetermined time lapses from the time when the data are finally transmitted and received to and from the AP after the step (e).

Another exemplary embodiment of the present invention provides a communication method in the IEEE 802.11 WLAN environment, including: (a) a first station and a second station performing a negotiation for set a direct link by a wireless channel, a secondary channel other than a basic service set (BSS) channel used for communicating with an access point (AP), when a traffic destined to the other station is generated in the first station or the second station; (b) the first station and the second station switching an operation channel from the BSS channel to the secondary channel when the negotiation for setting the direct link by the secondary channel succeeds according to the negotiation performance results; and (c) the first station or the second station transmitting data of the generated traffic to the other station through the secondary channel.

The method may further include: (d) the first station and the second station releasing the direct link setup when the traffic destined to the AP is generated in the first station or the second station after the step (c); (e) switching the operation channel from the secondary channel to the BSS channel by the station in which the traffic destined to the AP is generated among the first station and the second station; and (f) allowing the station in which the traffic destined to the AP is generated to transmit data of the generated traffic to the AP through the BSS channel.

The method may further include performing the negotiation for setting the direct link only by the BSS channel, with the other station in the case in which the traffic destined to the other station is generated when the predetermined time does not lapse from the time when the data are finally transmitted and received to and from the AP in the station in which the traffic destined to the AP is generated after the step (e).

The method may further include performing the negotiation for setting the direct link by the secondary channel, with the other station when the traffic destined to the other station is generated after the predetermined time does not lapse from the time when the data are finally transmitted and received to and from the AP in the station in which the traffic destined to the AP is generated after the step (e).

Advantageous Effects

According to the exemplary embodiments of the present invention, it is possible to use the multi-channel in the IEEE 802.11 WLAN environment to communicate between the stations and the APs, establish the direct link between the stations, and perform the multicast.

BEST MODE

Figure 1:
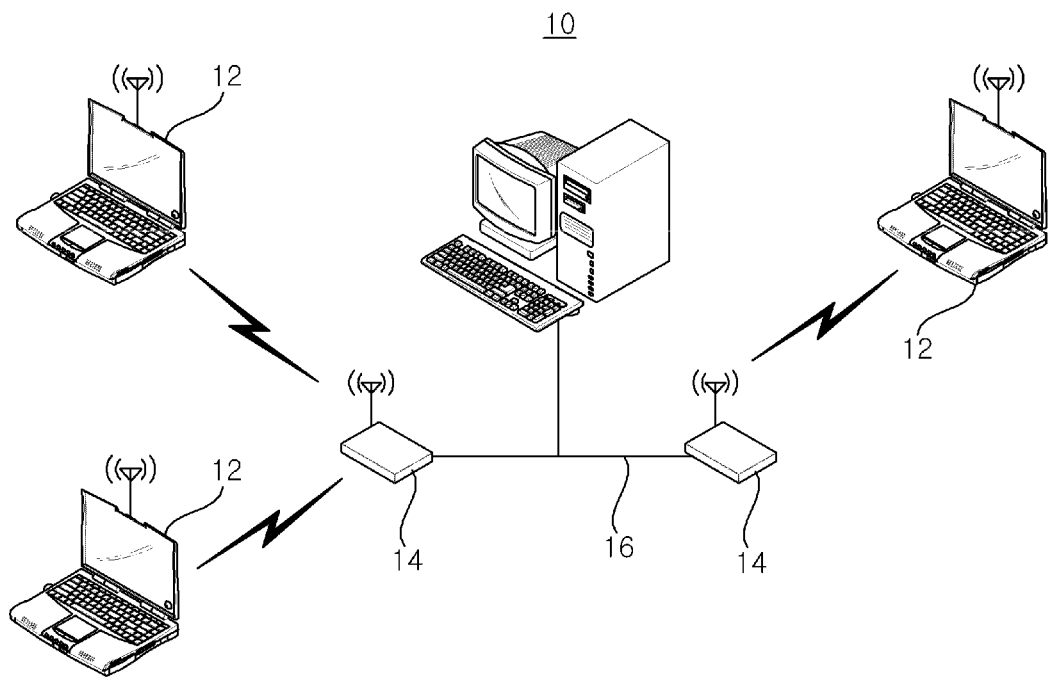
FIGS. 1 and 2 are conceptual diagrams of wireless network systems according to exemplary embodiments of the present invention.

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention.

Figure 2:
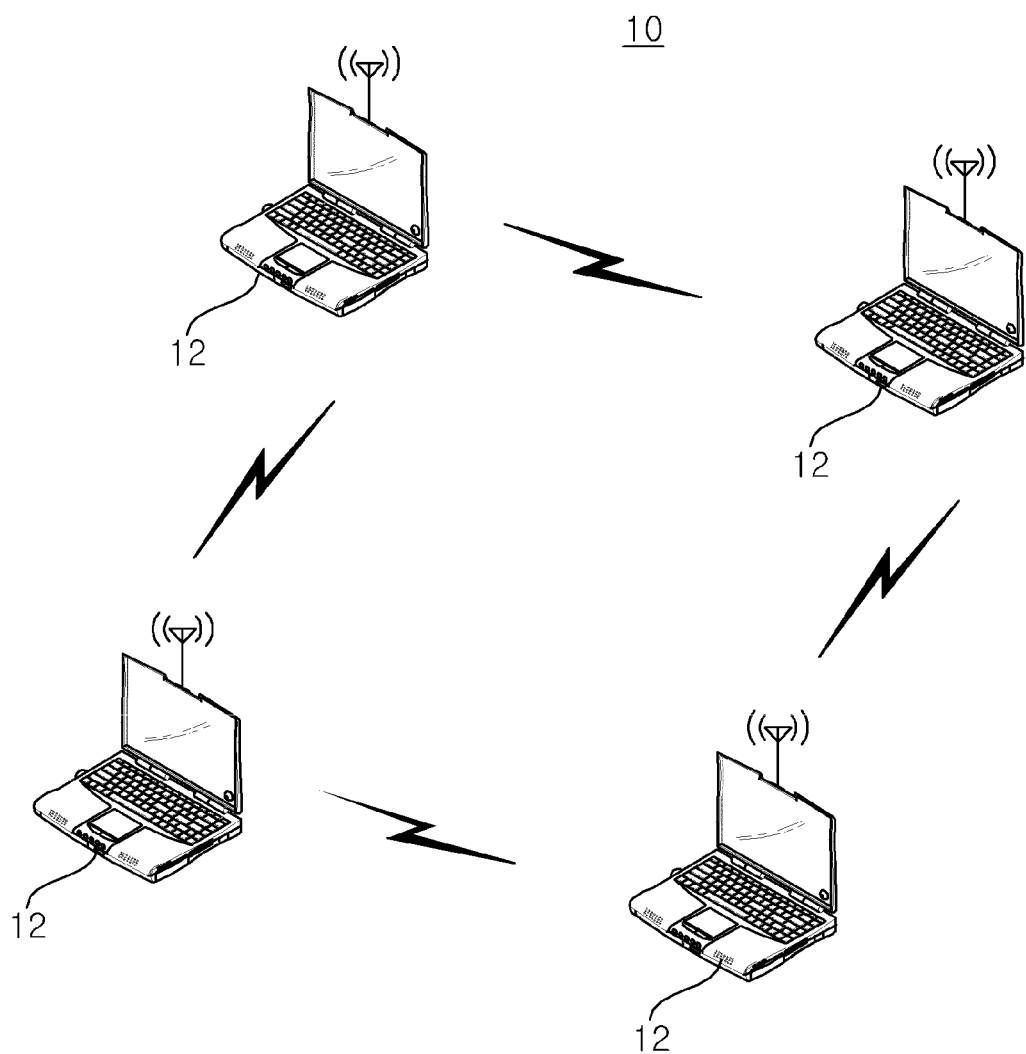

FIGS. 1 and 2 are conceptual diagrams of wireless network systems according to exemplary embodiments of the present invention. Like components of FIGS. 1 and 2 are denoted by like reference numerals.

Referring to FIG. 1, a wireless network system, for example, a WLAN system 10 includes a plurality of stations or terminals 12, access points or wireless base stations 14, and a backbone network or a distribution system 16.

The plurality of stations 14 is provided with a WLAN network interface card to perform an operation of a physical layer and a MAC layer based on IEEE 802.11 standard. In the WLAN system 10 shown in FIG. 1, the plurality of stations 12 are coupled with the APs 14 to transmit data frames.

The access point 14 performs a wired and wireless interworking bridge function that relays the frame transmitted from a single station to other station. The access point 14 performs the same function as an Ethernet bridge or a switch.

The access point basically includes the same physical layer and MAC layer as the station 12 as described above and therefore, the access point 14 may basically perform the same operation as the station 12. Therefore, the access point 14 may be considered as the same one as the station 12, if necessary.

The distribution system 16 is a backbone network that connects several access points 14. As the distribution system 16, Ethernet is generally used but may connect several access points in wireless. In a broad sense, the distribution system 16 may include a router or a switch connected to the Ethernet and severs connected to a wired and wireless Internet network.

Referring to FIG. 2, the wireless network system, for example, the WLAN system 10 includes the plurality of stations or terminals 12. The WLAN system 10 is directly connected to the plurality of stations 12 point-to-point. Therefore, unlike FIG. 1, the WLAN system 10 shown in FIG. 2 does not have the separate access point 14 or the distribution system 16 and the plurality of stations 12 replaces a role thereof or some roles or functions thereof may be omitted.

The exemplary embodiments of the present invention describe the WLAN system 10 with reference to FIGS. 1 and 2 but the wireless network system including the WLAN system according to the exemplary embodiment of the present invention is not limited thereto and may be implemented by a combination thereof or completely different system. In addition, the wireless network system according to the exemplary embodiment of the present invention may be present alone and may interwork with other wireless network system, a mobile communication network, and a wired and wireless Internet network.

For example, the WLAN system interworks with the mobile communication network to provide roaming services. In detail, when the WLAN system provides a voice service, a dual band dual mode (DBDM) terminal supporting both of the WLAN and WCDMA performs a voice call by using the mobile communication network and then, performs automatic roaming using the WLAN system without stopping in a geographical area in which the WLAN system is supported.

The WLAN system 10 shown in FIG. 1 and the WLAN system 10 shown in FIG. 2 may transmit data via the coupling process between the stations 12 or between the station 12 and the access point 14.

Figure 3:
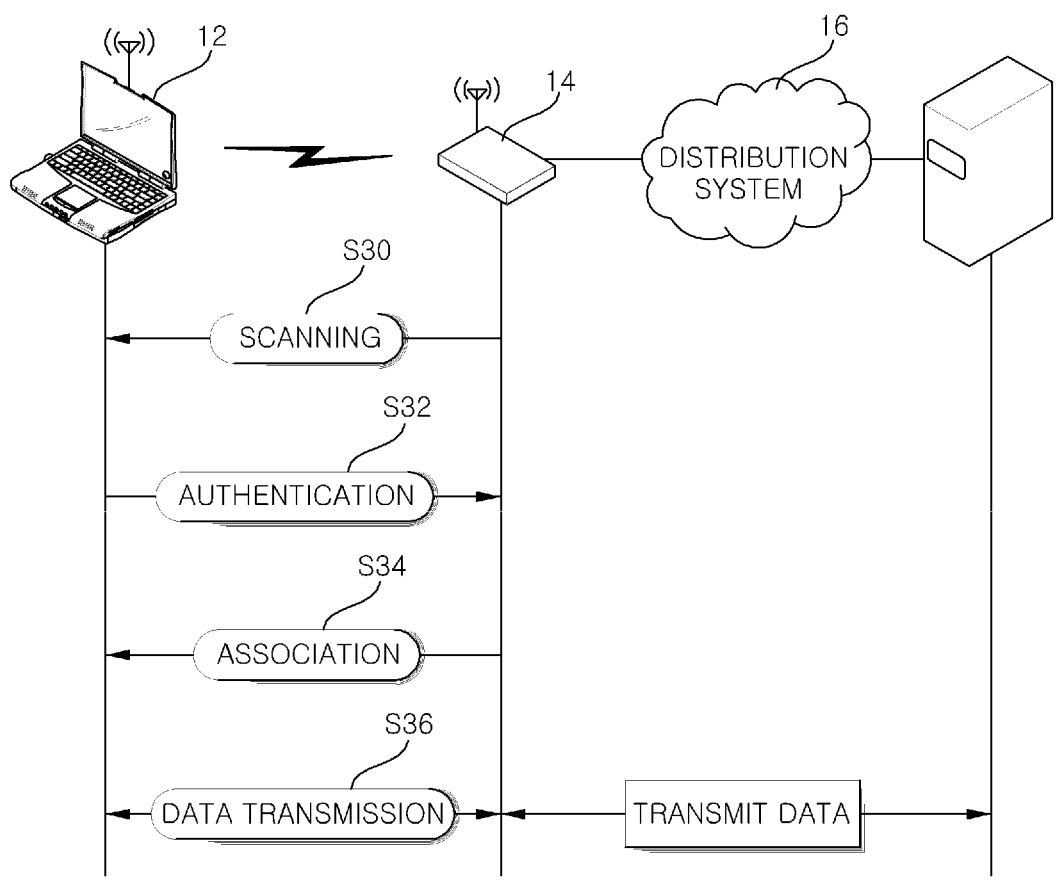
FIG. 3 is an operational procedure diagram showing a coupling process for transmitting data in the WLAN system of FIG. 2.

FIG. 3 is an operational procedure diagram showing a coupling process for transmitting data in the WLAN system of FIG. 2. The WLAN system of FIG. 2 or various wireless network systems as described above have a slight difference from FIG. 3, but includes the coupling process for the substantially same data transmission, and therefore, the detailed description thereof will be omitted.

Referring to FIGS. 1 and 3, the coupling process 20 for transmitting data between the station 12 and the access point 14 in the WLAN system 10 includes scanning (S30), authentication (S32), and association (S34). The station 12 and the access point 14 perform the data transmission (S36) via the above-mentioned processes (S30, S32, and S34).

The scanning (S30) uses beacon or probe messages to search the adjacent access points 14.

The scanning S30 includes passive scanning for searching the access point 14 from a beacon message periodically transmitted and active scanning selecting the corresponding access point 14 by allowing the station 12 to transmit a probe request and include a service set ID (SSID) and a probe response receiving an operation speed from the access point 14. The beacon message includes several capabilities (speed, encryption, or the Like) that may be supported by the access point 14 and a service group name belonging thereto, the service set ID (SSID), or the like.

The authentication (S32) is a process of verifying that the station 12 selecting the appropriate access point 14 by the scanning (S30) is a valid terminal for the corresponding access point 14. That is, the authentication (S32) is a process of negotiating the access point 14, the authentication procedure, and the encryption procedure. In most cases, an open system authentication method is used and therefore, the access point 14 performs unconditional authentication to the authentication request from the station.

As more reinforced authentication methods, there are EAP-TLS, EAP-TTLS, EAP-FAST, PEAP, or the like, based on IEEE 802.1x.

The association (S34) is a process of accessing the station 12 to the access point 14 after the authentication succeeds. The association (S34) means that the identifiable access between the station 12 and the access point 14 is set. When the association (S34) completes, the station (12) may communicate with other station 12 via the access point 14.

The association (S34) is performed by transmitting an association response including an association ID (AID) by which the access point 14 may be differentiated from other station when the station 12 transmits an association request to the access point 14.

The station 12 and the access point 14 perform the data transmission (S36) via the above-mentioned processes (S30, S32, and S34).

A process similar to the association (S34) is reassociation. The reassociation is a process of connecting the access point 14 to which the station 12 is connected to other access points. The reassociation is a process of setting a new coupling with other new access points 14 when the signals from the access point 14 to which the station 12 is connected is weak.

Generally, the stations 12 does not permit the transmission of the direct frames to other station 12 in the wireless network system 10 (BSS) shown in FIG. 1 and always depends on the access point 14 for transmitting frames.

However, the stations having the QoS facility (hereinafter, referred to as "QSTA") set the data transmission using the direct link setup (DLS) to directly transmit frames to other QSTAs.

In this case, The QoS facility is, for example, a set of enhanced functions used for providing the QoS defined in IEEE 802.11e, channel access rules, frame formats, a frame exchange sequence, and a management object.

The QSTA supports the QoS but is a station rather than an access point. The QSTA uses QAp for distribution system services (DSSs) without a hybrid coordinator. The QSTA serves as non-QSTA (nQSTA) when connecting to a non-QoS basic service set (nQBSS).

The direct link is a bidirectional link between one QSTA and another QSTA operated in the same infrastructure QoS basic service set (QBSS) without passing through the QoS access point (QAP). Once the direct link is setup, all the frames between two QSTAs are directly exchanged.

The quality of service (QoS) access point (hereinafter, referred to as QAP) is an access point supporting the QoS. The functions of the QAP are an upper set of the nQAP function and thus, may serve as the nQSTA. Meanwhile, the direct link setup (DLS) defines the direction link setup between the QSTAs operated in an infrastructure mode of a wireless network shown in FIG. 1.

The DLS is not applied to QIBSS that directly transmits the frames from one station to the other station at all times.

Figure 4:
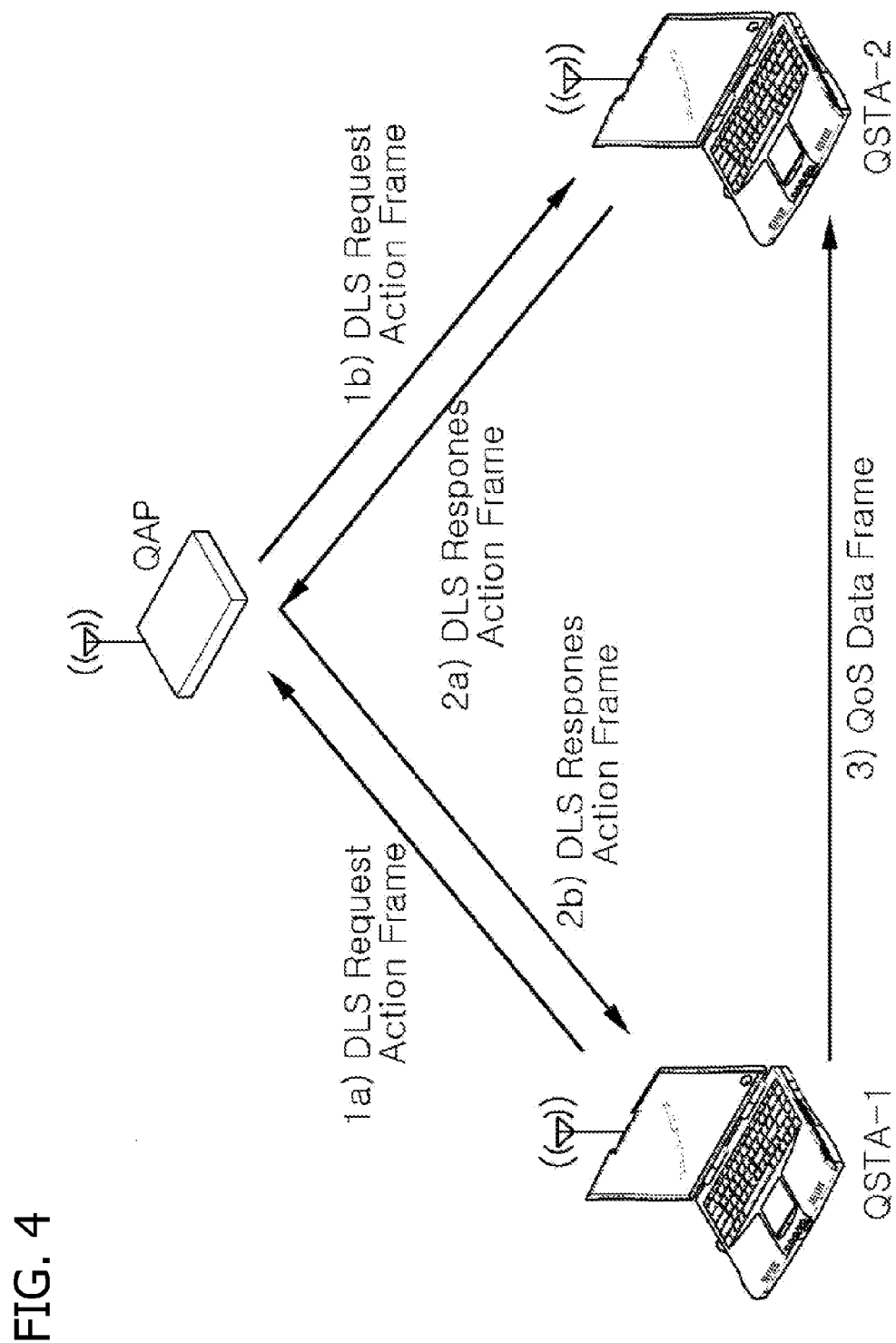
FIGS. 4 and 5 are procedure flow charts for direct link setup.
Figure 5:
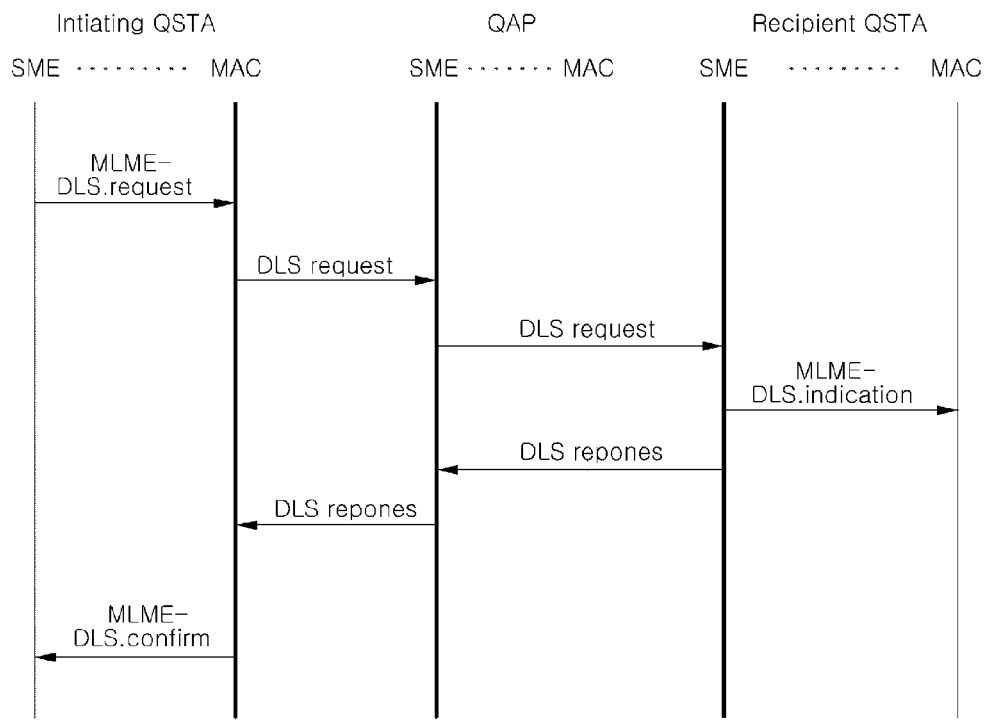

FIGS. 4 and 5 are procedure flow charts for the DLS.

Referring to FIGS. 4 and 5, step 1a), one station (QSTA-1) intending to directly exchange the frames with another non-access point station (QSTA-2) starts the DLS and transmits a DLS request frame or a DLS request message to the QAP. The DLS request includes a rate set of the QSTA-1, capability, and MAC addresses of the QSTA-1 and the QSTA-2.

At step 1b of FIG. 4, when the QSTA-2 is connected to the BSS, direct streams are permitted within a policy of the BSS, the QSTA-2 is an indeed QSTA, and the QAP forwards the DLS request frame to the receiver QSTA-2.

At step 2a of FIG. 4, when the QSTA-2 permits direct streams, the QSTA-2 transmits the DLS response frame or the DLS response message to the QAP and the response frame includes a rate set, (extended) capabilities of the QSTA-2, and the MAC addresses of the QSTA-1 and the QSTA-2.

At step 2b of FIG. 4, the QAP forwards the DLS request frame to the QSTA-1 and then, the direct link is in an active state and the frames may be transmitted from the QSTA-1 to the QSTA-2 and from the QSTA-2 to the QSTA-1.

At step 3 of FIG. 4, when an initiating QSTA (QSTA1) successfully sets the direct link through the DLS response, the data frame is transmitted through the direct link between the QSTA-1 and the QSTA-2.

The wireless network system 10 shown in FIGS. 4 and 5 effectively performs inter-QSTA communication when the direct link is used between the QSTAs. However, when the access point is not the QAP, it is not possible to set the DLS even in the case of the QSTA.

In the above-mentioned wireless network system, for example, the WLAN (IEEE 802.11e) DLS protocol, the DLS related management frames are transmitted and received between the QSTA and the QAP. Therefore, the QAP needs a function of relaying the management frame.

Hereinafter, a method for setting an inter-station direct link according to another exemplary embodiment of the present invention will be described. First, to help understanding, the iDLS that has been researched by the present inventors will be briefly described.

Figure 6:
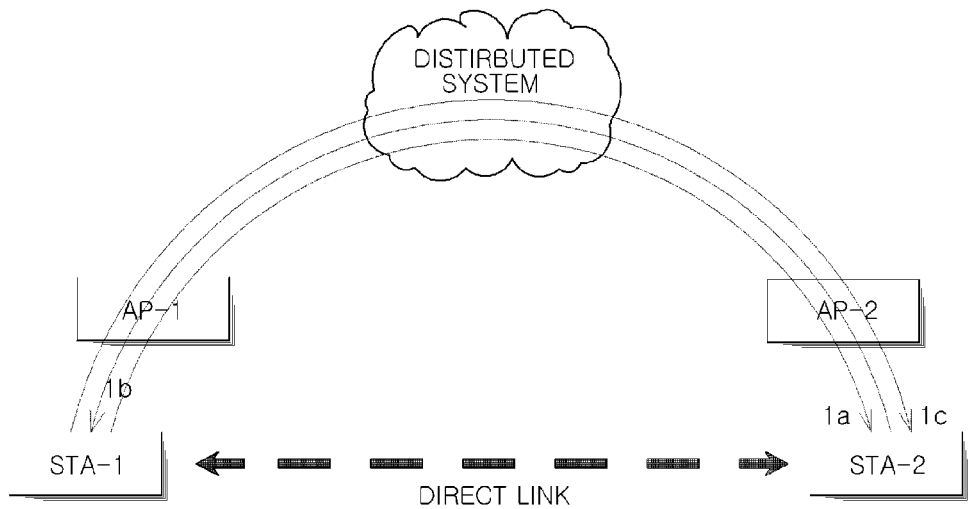
FIG. 6 is a reference diagram for describing an operation of setting an inter-station direct link in the iDLS.

FIG. 6 is a reference diagram for describing an operation of setting an inter-station direct link in the iDLS.

In FIG. 6, the STA-1 and STA-2 are each associated with AP-1, SSID-1, and SSID-2. The service set identifier (SSID) is a unique identifier attached to each header of packets transmitted through the WLAN and is used like encryption when the wireless devices are connected to the basic service set (BSS). The AP-1 and the AP-2 are connected to the distribution system. FIG. 6 shows the case in which the STA-1 and the STA-2 each belong to different BSSs and have two APs, but the STA-1 and the STA-2 may belong to the same BSS and the AP may be one.

The start station (STA-1) transmits the direct link setup encapsulated like a general data frame from the AP-1 to the AP-2 (1a). The direct link setup request includes the rate set, the facility of STA-1, and the MAC address of the STA-1 and the STA-2. In the STA-1, a trigger for starting the direct link setup is generated in the upper layer. The encapsulation method used for transmitting the direct link setup request like the data frame may use the method proposed in [Wentink et al., New DLS (nDLS), IEEE 802.11 DLS SG, document 802.11-07/0478r0, 2007.].

When the STA-2 authorizes the direct link setup request, the STA-2 transmits the direct link setup response to the STA-1 via the AP-2 and the AP-1. The direct link setup response includes the rate set and the facility of the STA-2. When the STA-1 authorizes the direct link setup response from the STA-2, the STA-1 transmits acknowledgement to the STA-2 (1c).

When the processes (1a to 1c) complete, the direct link is activated and the data frames may be directly transmitted from the STA-1 to the STA-2, or vice versa. A table including information on a pair of the direct link setups is maintained in each station in which the direct link is set. The table has information on the direct link, for example, an MAC addresser of the other station, information on a communication state, or the like, and each station is indexed by the unique identifier. Referring to the Table, the station may differentiate the frame designated from or to the direct link from the frame designated from or to the associated AP.

Figure 7:
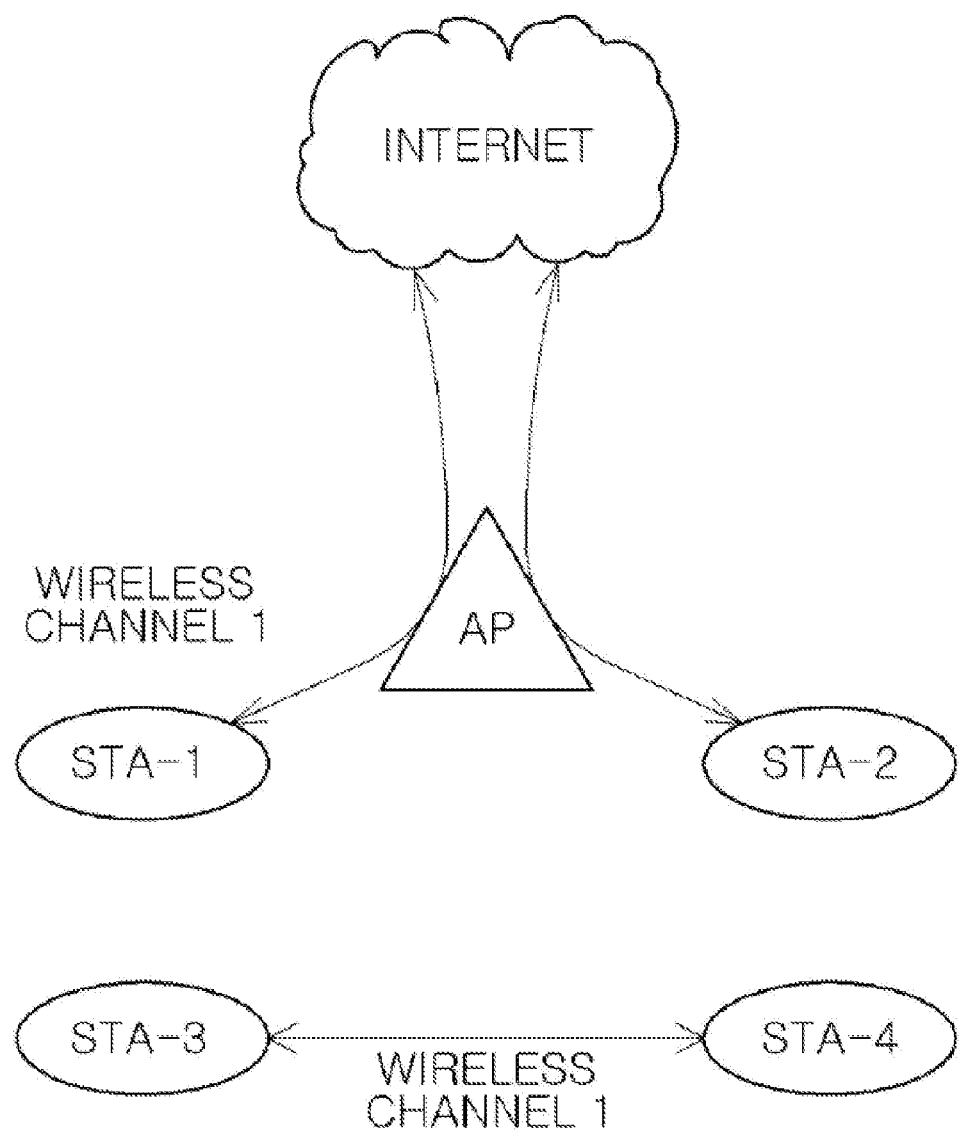
FIG. 7 is a reference diagram for describing efficiency of a wireless channel resource by a direct link setup method according to the DLS according to the related art or the iDLS.

FIG. 7 is a reference diagram for describing efficiency of a wireless channel resource by a method of setting a direct link according to the DLS of the related art or the iDLS. In FIG. 7, the BSS is configured by the BSS and four stations (STA1 to 4) and the STA-1 and the STA-2 each communicate with the APs and the STA-3 and the STA-4 have a sufficient good channel environment, such that they set the direct link to each other to transmit and receive the data frames. The wireless channel resources are shared in five devices and the transmission frequency is further reduced than in the case in which the DLS or iDLS is not used, thereby increasing the use efficiency of the wireless channel resources. For example, as shown, the number of data frames to be actually transmitted is 6 and the transmission frequency of data frames is six times as STA-1->AP, AP->STA-1, STA-2->AP, AP->STA-2, STA-3->STA-4, STA-4->STA-3. Therefore, a normalized throughput indicated by "the number of data frames to be transmitted/transmission frequency" becomes 6/6=1. When the STA-3 and the STA-4 transmits and receives the data frames via the AP without using the DLS or iDLS, the transmission frequency is eight times and thus, the normalized throughput will be 6/8=0.75.

Figure 8:
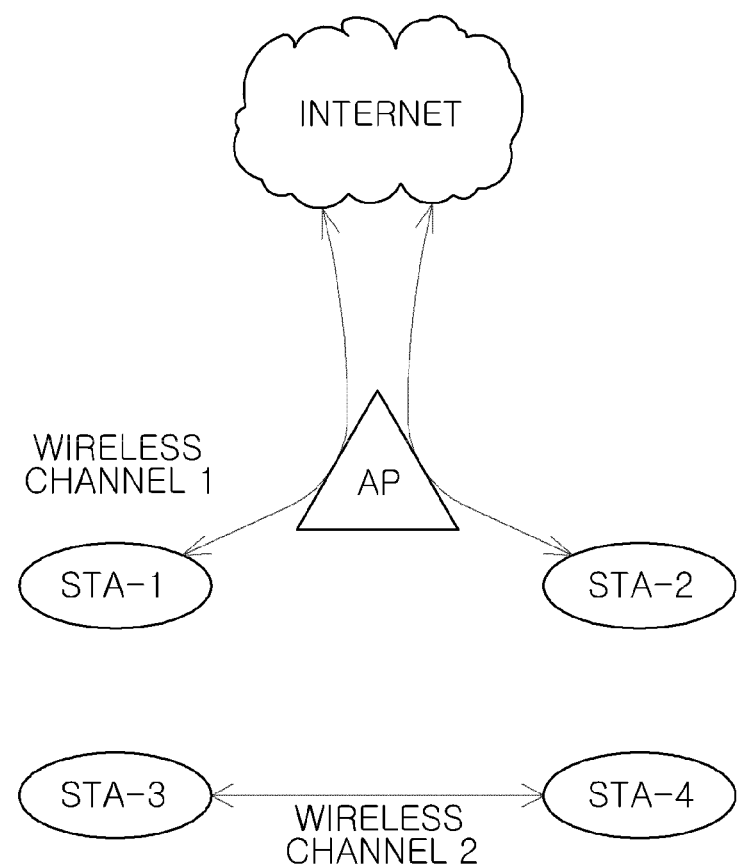
FIG. 8 is a reference diagram for describing a concept of further increasing use efficiency of a wireless channel resource when setting the direct link using other channels other than a BSS channel.

However, when the direct link is set between the stations using other channels other than the BSS channel (wireless channel 1) used for communicating with the AP, the use efficiency of the wireless channel resources may be further increased. FIG. 8 is a reference diagram for describing the concept. When the STA-3 and the STA-4 are transmitted and received to and from each other, the direct link is set between the STA-3 and the STA-4 by other available channels (wireless channel 2) other than the BSS channel and the transmission and reception is performed through the channel. In wireless channel 1, the number of data frames to be actually transmitted and the transmission frequency each are 4 and 4 and thus, the throughput is 4/4 and in wireless channel 2, the number of data frames to be actually transmitted and the transmission frequency each are 2 and 2 and thus, the throughput is 2/2. Therefore, it can be appreciated that a total throughput in the BSS is 4/4+2/2=1 and thus, the use efficiency of the wireless channel resources may be further increased.

Therefore, in the exemplary embodiment of the present invention, when the traffic generated from the station is destined for the other station, the station temporarily sets the direct link to the destination station through channels other than the BSS channel and transmits and receives the data frame through the other channel. For convenience, channels other than the BSS channel are hereinafter referred to as secondary channels. In order to reduce the interference with the BSS channel, the secondary channel may be a channel orthogonal to the BSS channel but the present invention is not limited thereto.

Figure 9:
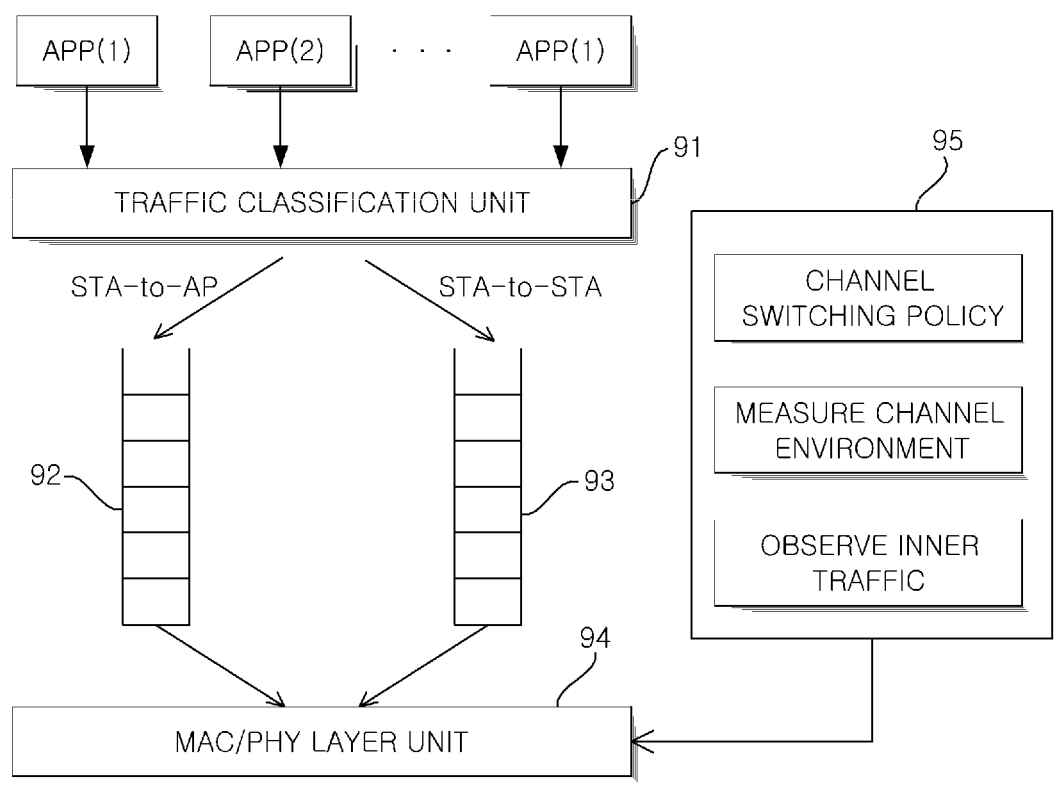
FIG. 9 is a diagram showing a structure of a station for IEEE 802.11 WLAN environment according to an exemplary embodiment of the present invention.

FIG. 9 is a diagram showing a structure of a station for IEEE 802.11 WLAN environment according to an exemplary embodiment of the present invention. Referring to FIG. 9, a plurality of APP (1) to APP (N) are installed in the station and the applications each generate the traffic. The traffic may be destined to a station, or to the AP associated with the station. A traffic classification unit 91 receives the traffic generated from applications APP (1) to APP (N) in a link layer and classifies the traffic into a traffic (STA-to-AP) destined to the AP and a traffic (STA-to-STA) destined to the other station. Further, a traffic classification unit 91 stores the classified traffics in different buffers according to the destination. For example, as shown, the traffic destined to the AP is stored in a STA-to-AP traffic buffer 92 and the traffic destined to the other station is stored in a STA-to-STA buffer 93.

Each buffer 93 and 93 is connected with a MAC/PHY layer unit 94 supporting a multi-channel and the operation channel is switched from the BSS channel to the secondary channel according to commands of a channel switching unit 95 to be described below or is switched from the secondary channel to the BSS channel. Further, the traffic transmitted from each buffer 92 and 93 is transmitted through the BSS channel or the secondary channel. The channel switching unit 95 determines which traffic stored in any one of each buffer 92 and 93 is transmitted to the MAC/PHY layer unit 94 and the operation channel of the MAC/PHY, that is, the operation channel of the station. In order to perform the determination, the channel switching unit 95 has a channel switching policy and measures the channel environment and observes the inner traffic. That is, the channel switching unit 95 periodically measures the state of the available channels other than the BSS channel and maintains the measured result information and observes the STA-to-AP traffic buffer 92 and the STA-to-STA traffic buffer 93. The channel switching unit 95 measures the channel environment and determines the operation channel of the MAC/PHY layer unit 94 according to the predetermined channel switching policy based on the results obtained by observing the inner traffic.

The channel switching policy may be set, for example, as follows.

For example, the channel switching policy may be set according to the QoS demand of the operating application. For example, when any video streaming demands 20 Mbps through the direct link, the channel switching policy may determine the operation channel of the MAC/PHY layer unit 94 so as to transmit the corresponding traffic to the secondary channel having a bandwidth corresponding to the demanded amount.

As another example, when the direct link is set with the other station in the current secondary channel and the STA-to-AP traffic is generated in the STA-to-AP traffic buffer 91 during the communication, the direct link is released in the secondary channel and the negotiation with the other station about whether the direct link is set in the BSS channel may be performed. In this case, the STA-to-AP traffic is transmitted to the AP through the BSS channel.

As another example, the channel switching is not performed and the station is operated on the BSS channel for a predetermined time (T_staying) from the time when the data frame is finally transmitted to the AP or is received from the AP. That is, when the direct link is set within the T_staying time, the negotiation so as to set the direct link by the BSS channel is performed and the negotiation with the other station is performed so as to be set in the secondary channel rather than the BSS channel when the transmission and reception to and from the AP is not present even when the T_staying lapses, The T_staying value is a minimum threshold time that the BSS channel is not switched to the secondary channel and may be set to be any approximate value.

Most traffics between the station and the AP are an interactive traffic such as web browsing or instance messaging. For example, when HTTP-Request is generated from an application of one station, the traffic toward the AP is created and when the AP receives the created traffic, the AP transmits the HTTP-Request to the station. Therefore, it is preferable not to perform the channel communication for smooth communication with the AP. However, no data are transmitted from the AP or to the AP so as to be the passage of the predetermined time after the transmission and reception to and from the AP are generated, which means a request not to expect a response from the beginning or a response lost in the network. Therefore, the station is stayed in the BSS channel for the appropriately set T_staying time and is switched to the secondary channel without the transmission and reception to and from the AP even though the T_staying time lapses.

Figure 10:
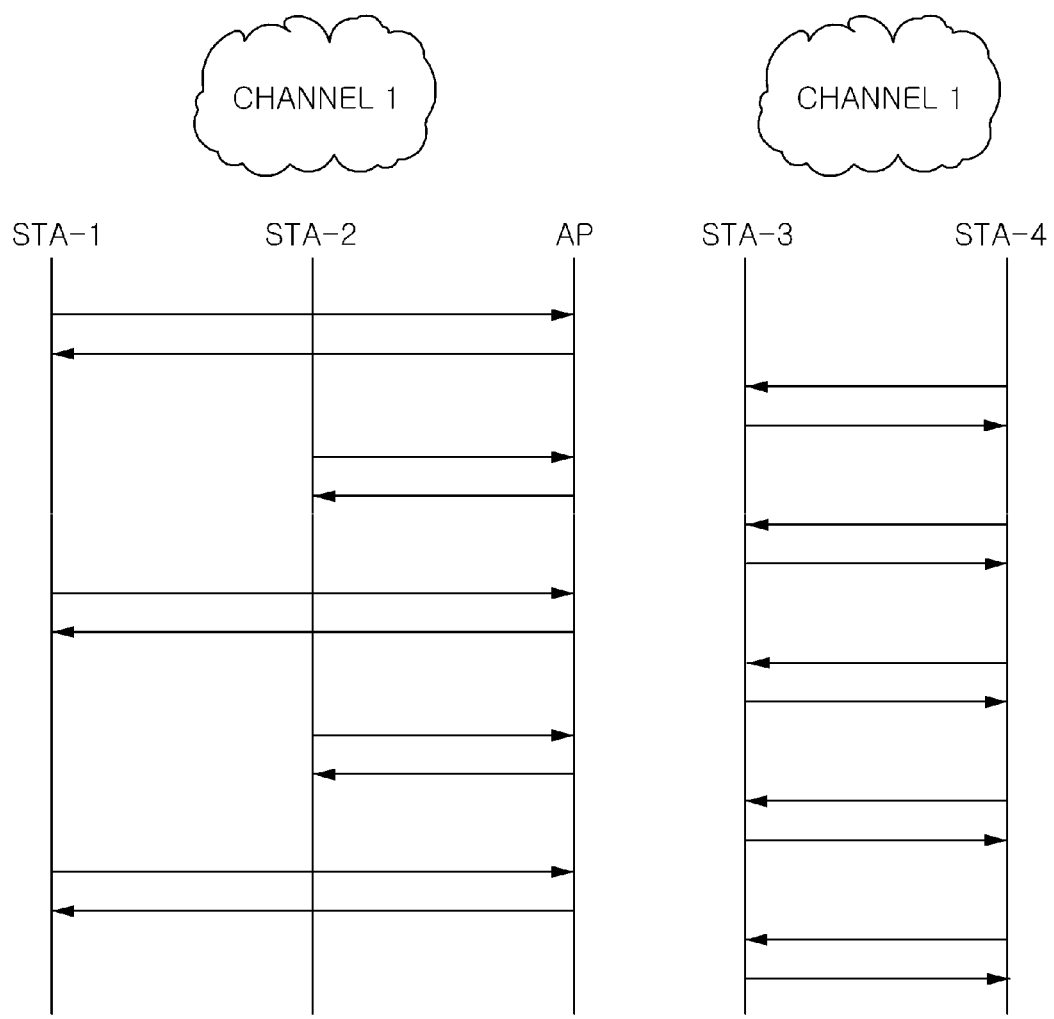
FIG. 10 is a diagram showing a flow of signals between stations and APs or between the stations according to the OLS or the iDLS in the WLAN environment as shown in FIG. 7.
Figure 11:
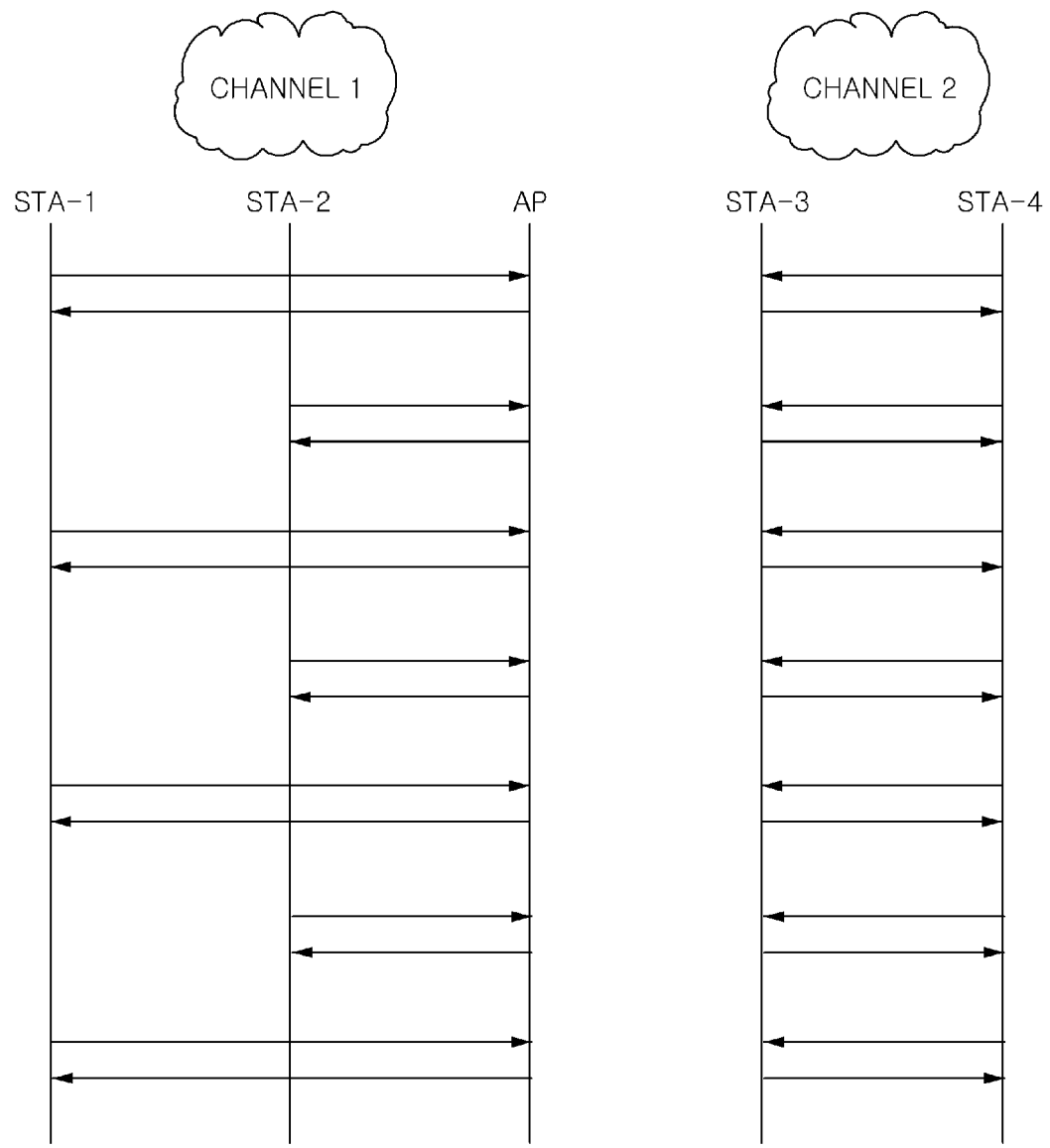
FIG. 11 is a diagram showing a flow of signals between the stations and the APs or between the stations according to the exemplary embodiment of the present invention in the WLAN environment as shown in FIG. 8.

FIG. 10 is a diagram showing a flow of signals between stations and APs or between the stations according to the DLS or the iDLS in the WLAN environment as shown in FIG. 7 and FIG. 11 is a diagram showing a flow of signals between the stations and the APs or between the stations according to the exemplary embodiment of the present invention in the WLAN environment as shown in FIG. 8.

Referring to FIG. 10, the stations (STA-1 to 4) belonging to the BSS and the APs use the single wireless channel and therefore, transmit different data frames at different timings by a multiplexing method such as CSMA/CA. That is, the STA-1 and the STA-2 communicate with the AP through channel 1, respectively and the STA-3 and the STA-4 also set the direct link through channel 1 to perform the direct transmission and reception therebetween and each station transmits the data frames to the destinations at different timings.

Referring to FIG. 11, the STA-1, the STA-2, and the APs communicate with each other through channel 1 and the STA-3 and the STA-4 set the direct link through channel 2 to directly transmit and receive data therebetween. Therefore, as shown in FIG. 11, the transmission and reception through the direct link between the STA-3 and the STA-4 and the transmission and reception between the STA1 or the STA-2 and the AP may be simultaneously generated.

Figure 12:
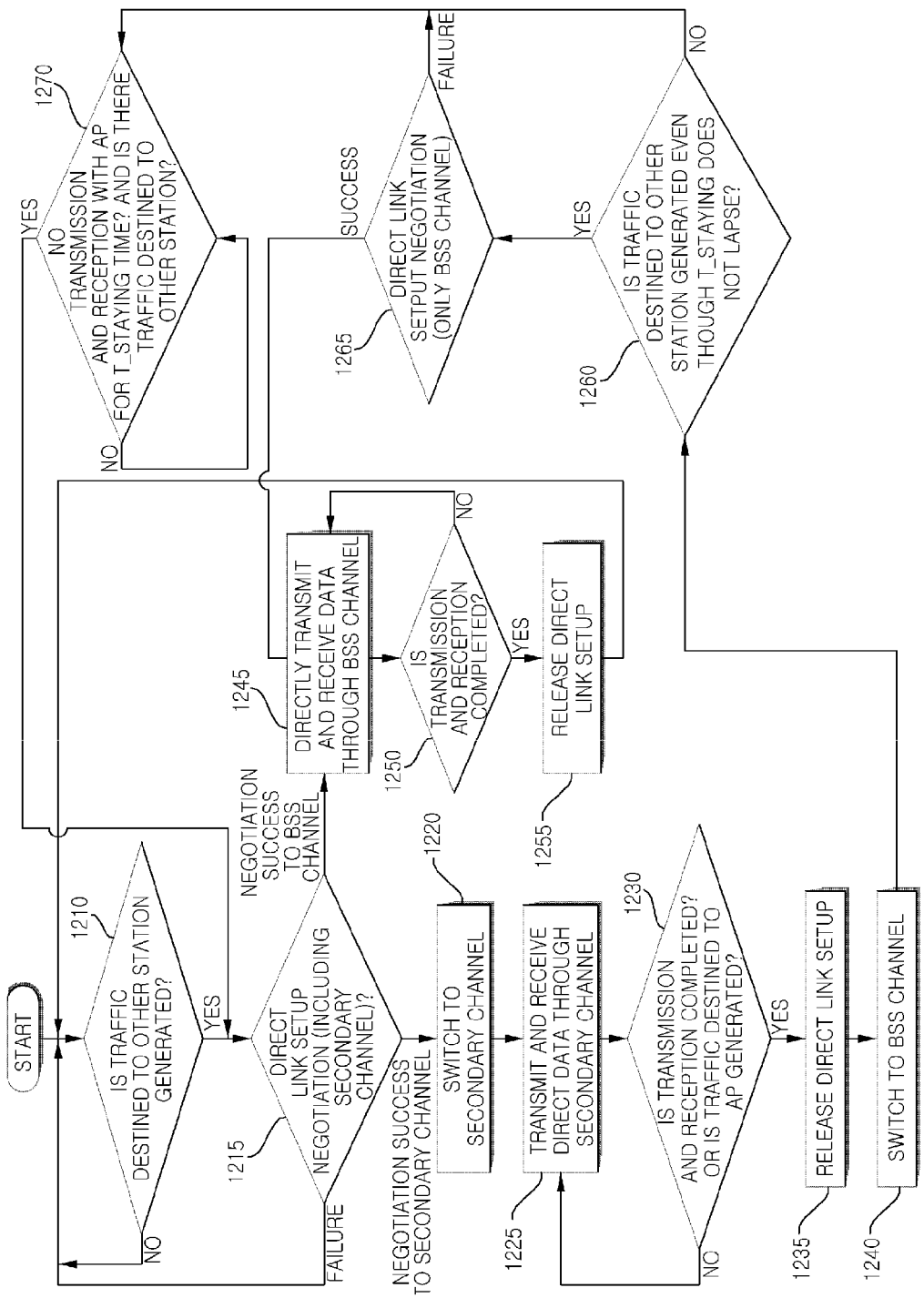
FIG. 12 is a diagram showing a flow chart of a method of setting a direct link in the IEEE 802.11 WLAN environment according to the exemplary embodiment of the present invention.

FIG. 12 is a flow chart of a method of setting a direct link in the IEEE 802.11 WLAN environment according to the exemplary embodiment of the present invention. The method of setting a direct link according to the exemplary embodiment of the present invention includes the processes processed in the WLAN station shown in FIG. 9. Therefore, the contents that are not described below but described above with reference to the WLAN station may also be applied to the method of setting a direct link according to the exemplary embodiment of the present invention.

In the exemplary embodiment of the present invention, the stations are operated as channel 1 (BSS channel) at an initial state or are assumed to be one of the state in which the stations communicate with the APs and the state in which the stations do not transmit and receive to and from the APs and the other station.

At S1220, it is determined whether the traffic destined to the other station is generated. This may be appreciated by observing the STA-to-STA traffic buffer 93. When the traffic destined to the other station is generated, the process proceeds to S1215 to perform the negotiation for the direct link setup with the corresponding stations. Hereinafter, for convenience, the corresponding station is referred to as the other station. The negotiation for the direct link setup means a series of processes of transmitting the direct link setup request to the other station via the AP, receiving the direct link setup response via the APs from the other station, and transmitting ACK therefor to the other station via the AP. In the exemplary embodiment of the present invention, the channel for the direct link setup includes the BSS channel and the secondary channel other than BSS channel. Therefore, the negotiation results at S1215 may be the case of the negotiation intending to set the direct link by the BSS channel, the negotiation intending to set the direct link by the secondary channel, or the negotiation failure. The case in which the negotiation for setting the direct link has failed may be, for example, a case of not receiving the direct link setup response from the other station or a case of refusing the direct link setup because the other station is communicating with the AP.

When the negotiation for the direct link setup has failed, the process returns to S1210 again and when there still is the traffic destined the other station, the process proceeds to S1215 again and the negotiation for setting the direct link is tried again.

At S1215, when the negotiation intending to set the direct link the other station and the secondary channel is performed, the process proceeds to S1220, such that the station switches the operation channel to the secondary channel. That is, the MAC/PHY layer unit 94 is operated as the secondary channel. When the direct link with the other station is set through the secondary channel, the data of the traffic is directly transmitted and received through the other station and the secondary channel at S1225. Thereafter, when the transmission and reception to and from the other station is completed or the traffic destined to the AP is generated (S1230), the process proceeds to S1235 to release the direct link setup in the secondary channel. In this case, the station is operated as the secondary channel and therefore, the release of the direct link setup is performed by transmitting the direct link release request to other station without passing through the AP and receiving the ACK from the other station.

When the direct link setup is released, the process proceeds to S1240, such that the station switches the operation channel to the BSS channel again. Further, the data of the traffic destined to the AP are transmitted to the AP through the BSS channel.

Referring back to S1215, when the negotiation that the direct link is set to the other station and the BSS channel at S1215 is performed, the direct link is set by the BSS channel and the data are directly transmitted and received to and from the other station through the BSS channel at S1245. In this case, the station may transmit and receive the data to and from the AP through the BSS channel.

At S1250, when the data transmission and reception to and from the other station is completed, the process proceeds to S1255 to release the direct link setup. In this case, the station is operated as the BSS channel and therefore, the release of the direct link setup is performed by transmitting the direct link release request to the other station via the AP and receiving the ACK via the AP from the other station.

Referring back to S1240, after being switched to the BSS channel at S1240, the station observes that the transmission and reception to and from the AP is generated for at least T_staying from the time when the data are finally transmitted and received to and from the AP.

At S1260, when the T_staying time does not lapses, but the traffic destined to the other station is generated, the process proceeds to S1265 to negotiate with the corresponding station so as to perform the direct link setup by only the BSS channel. This is achieved by including only the BSS channel as a channel available for the direct link setup request to be described in FIG. 13 to be described below. When the negotiation succeeds, the direct link is set through the BSS channel and the process proceeds to S1245 to directly transmit and receive the data to and from the other station through the BSS channel.

At S1270, when the T_staying time lapses from the time when the data are finally transmitted and received to and from the AP and the traffic destined to the other station are present, the process proceeds to S1215 again to perform the negotiation for the direct link setup with the corresponding station.

When the operation channel is switched to the secondary channel immediately without waiting for a predetermined time after transmitting and receiving the data to and from the AP, there is the problem in that the data transmitted from the AP through the BSS channel is not received. Therefore, the station stays in the BSS channel by setting the direct link only through the BSS channel for the predetermined time after data are transmitted and received to and from the AP according to the exemplary embodiment of the present invention and the negotiation for the direct link setup including the secondary channel is performed after it is checked that the data transmitting and reception to and from the AP are not generated any more, such that the above-mentioned problem occurring due to the immediate switching to the secondary channel may be solved.

Figure 13:
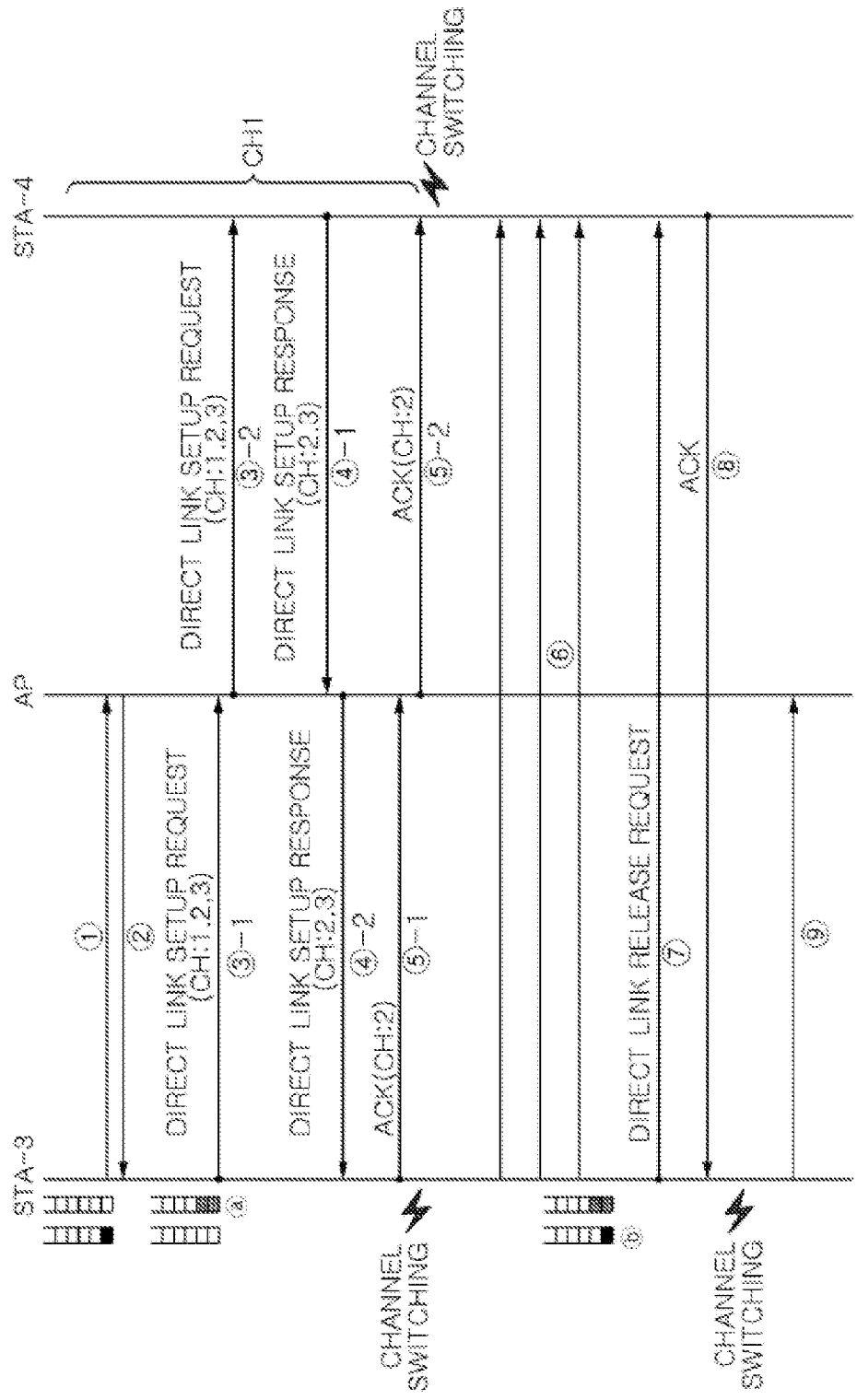
FIG. 13 is a diagram showing an example of a signal flow that may be generated in two stations and the APs through S710 to S740.

FIG. 13 is a diagram showing an example of a signal flow that may be generated in two stations and the APs through S1210 to S1240 of FIG. 12. In FIG. 13, CH 1 corresponds to the BSS channel and CH 2 and CH 3 belong to the selectable secondary channel. Further, the left in the shown buffer represents the STA-to-AP traffic buffer and the right represents the STA-to-STA traffic buffer. Referring to FIG. 13, the STA-3 transmits and receives data through the AP and CH 1 (1 and 2). Then, the traffic destined to the STA-4 is generated and the traffic is stored in the STA-to-STA traffic buffer (a). Then, the STA-3 attempts the negotiation for the direct link setup with the STA-4.

For the negotiation, the STA-3 transmits the direct link setup request to the STA-4 via the AP (3-1 and 3-2). In this case, the direct link setup request includes the information on the channel available for the direct link setup. The available channel may be defined according to the state of each channel and the channel switching policy measured in the station. The example shown in FIG. 13 shows the case in which the STA-3 selects CH 1, CH 2, and CH 3 as the available channel.

The STA-4 receiving the direct link setup request transmits the direct link setup response to the STA-3 via the AP in response thereto (4-1 and 4-2). In this case, the STA-4 selects the available channel therefor among the available channels included in the direct link setup request to include the resultant information in the direct link setup response. The example shown in FIG. 13 shows the case in which the STA-4 selects the CH 2 and CH 3 as the available channel.

The STA-3 receiving the direct link setup response transmits the ACK to the STA-4 via the AP in response thereto (5-1 and 5-2). In this case, the STA-3 selects the channel for the direct link setup among the available channels included the direct link setup response to include the resultant information in the ACK. The channel selection may be performed according to the measured state of the channel. The example shown in FIG. 13 shows the case in which the STA-3 selects CH 2 as the channel for the direct link setup.

Therefore, the CH 2 rather than the BSS channel operated before is selected as the channel for the direct link setup and therefore, the STA-3 and the STA-4 perform the channel switching through CH 2. The direct link is set through CH 2 and the STA-3 and the STA-4 directly transmit and receives data through CH 2 (6).

As the negotiation result for the direct link setup of the STA-3 and the STA-4, when the CH 1 is determined as the channel for the direct link setup, the channel switching is not generated and the direct link is set through the CH 1 and the STA-3 and the STA-4 may directly transmit and receive data through the CH 1.

In addition, when the negotiation for the direct link setup of the STA-3 and the STA-4 has failed, the negotiation is retried and the data are transmitted and received via the AP.

Then, the traffic destined to the AP is generated and the traffic is stored in the STA-to-AP traffic buffer (b). Then, the STA-3 transmits the direct link release request to the STA-4 (7) and the STA-4 transmits the ACK to the STA-3 in response thereto (8), thereby releasing the direct link setup. Further, the STA-3 performs the channel switching so as to return to the CH 1 again for communication with the AP and transmits the data to the AP through the CH 1.

Figure 14:
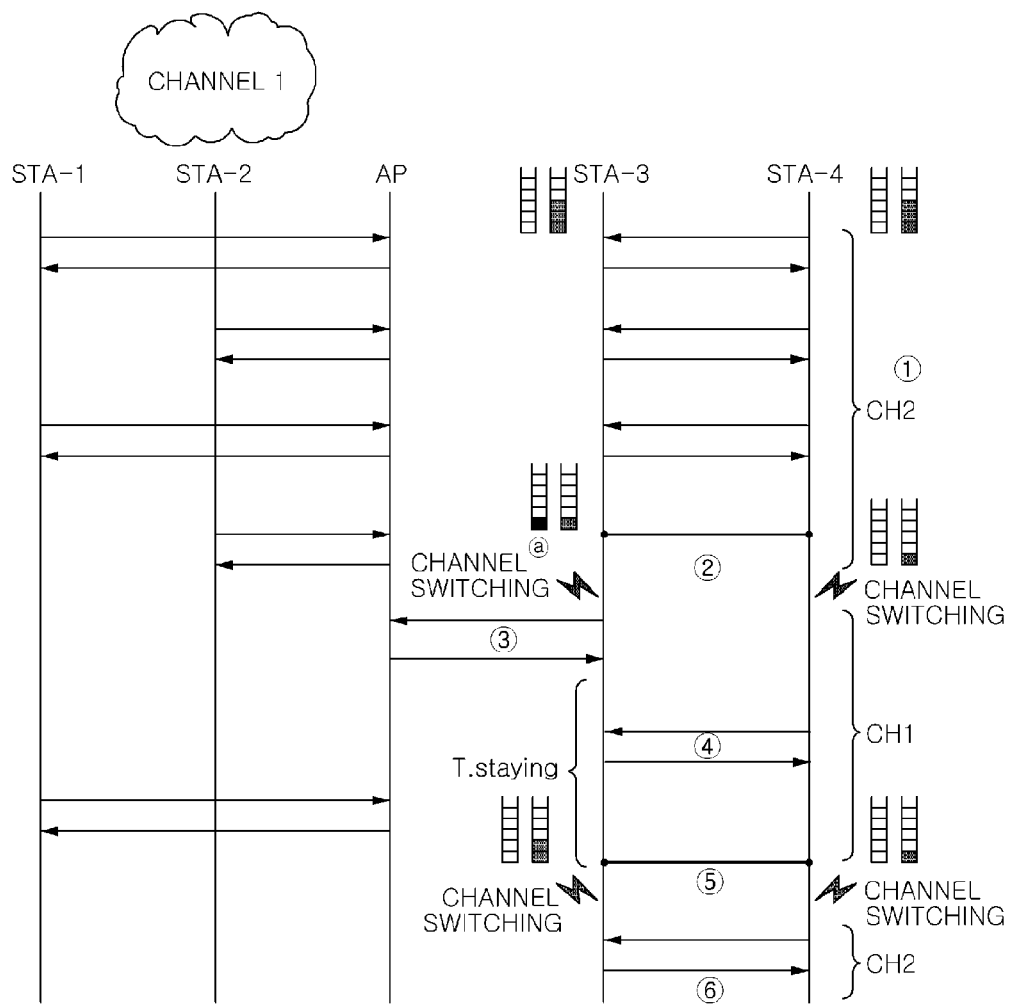
FIG. 14 is a diagram showing an example of the signal flow that may be generated in the BSS by the direct link setup method according to the exemplary embodiment of the present invention.

FIG. 14 is a diagram showing an example of the signal flow that may be generated in the BSS by the direct link setup method according to the exemplary embodiment of the present invention. In FIG. 14 as in FIG. 13, the left in the shown buffer represents the STA-to-AP traffic buffer and the right represents the STA-to-STA traffic buffer.

Referring to FIG. 14, the STA-1 and the STA-2 each communicate with the AP through the BSS channel, that is, the CH 1 or the STA-1 and the STA-2 set the direct link with each other through CH1 and directly transmit and receive the data through the CH 1.

Meanwhile, the STA-3 and the STA-4 set the direct link through the secondary channel, that is, the CH 2 and directly transmit and receive the data through the CH 2 (1) Then, when the traffic destined to the AP is generated in the STA-to-AP traffic buffer of the STA-3 (*a*), the STA-3 releases the direct link through the STA-4 and the CH 2 (2) and switches the operation channel to the CH 1 for communication with the AP. Then, the STA-3 transmits and receives the data to and from the AP through the CH 1 (3).

The STA-3 observes whether the transmission and reception to and from the AP is generated for the T_staying time from the time when the data are finally transmitted and received to and from the AP. Meanwhile, when the negotiation for the direct link setup with the STA-4 within at least T_staying time from the time when the data are finally transmitted and received to and from the AP is performed, the direct link is set by the CH 1 and the data are directly transmitted and received (4). The transmission and reception to and from the AP and the transmission and reception to and from the STA-4, and the communication among the STA-1, STA-2, and the AP are performed at different timings in the CH 1. The resource distribution is determined according to the priority defined between the applications in the STA-3 and is determined between each station and the APs by the multiplexing method such as CSMA/CA.

After the direct link with the STA-4 is released, as shown in FIG. 14, the data transmission and reception to and from the AP is not generated so that the T_staying time lapses and when the data transmitted and received between the STA-3 and the STA-4 are present, the negotiation for the direct link setup is performed, including the secondary channel (5). When the CH 2 is determined again as the channel for the direct link setup according to the negotiation results, the STA-3 and the STA-4 are switched to the CH 2. Further, the data are directly transmitted and received through the CH 2 (6).

Figure 15:
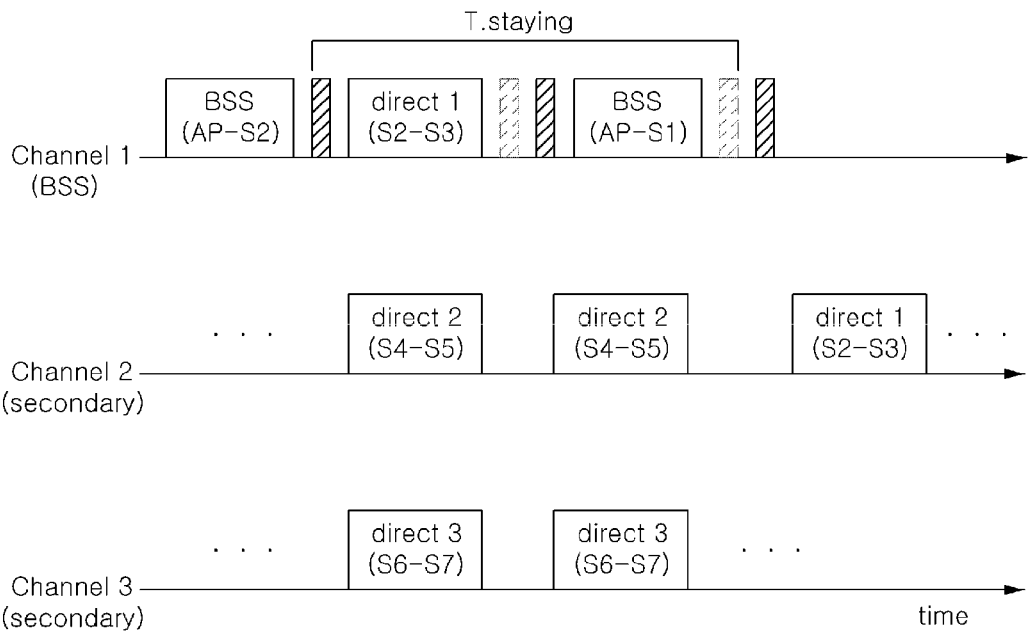
FIG. 15 is a diagram showing an example of setting the direct link in each channel and a form occupied therein according to T_staying time by the direct link setup method according to the exemplary embodiment of the present invention.

FIG. 15 is a diagram showing an example of setting the direct link in each channel and a form occupied therein according to a T_staying time by the direct link setup method according to the exemplary embodiment of the present invention. In FIG. 15, a box BSS (AP-S#) represents a period in which station S# communicates with the AP and a box direct n is a period in which the direct connection is set, and for example, direct 1 (S2-S3) represents a period in which the station S2 and the station S3 are set as the direct connection. Referring to FIG. 15, the direct connection direct 1 between the stations S2 and S3 is performed in the BSS channel Channel 1) for the T_staying time since the station S2 communicates with the AP immediately before and the direct connection setup may be performed in the other channel Channel 2) after the T_staying time lapses.

Hereinafter, a pseudo multicast capability (PMC) protocol for effectively performing the multicast communication between IEEE 802.11 based devices is proposed. The PMC combines the unicast and the station or the selective operation mode transformation of the terminal so as to improve the communication capability between the single multicast transmitter and the plurality of multicast receivers. The present protocol implements the efficient wireless multicast without replacing the hardware for the WLAN terminal previously spread.

Currently, the IEEE 802.11 processes the multicast by the method such as broadcast in the data link layer. Therefore, the multicast packets may be transmitted only at the basic transmission rate in the physical layer and the retransmission cannot be performed at the time of the transmission failure. For example, the multicast communication using the IEEE 802.11a device may be transmitted only at the transmission rate of 6, 12, and 24 Mbps and the retransmission cannot be performed after one-time transmission, thereby reducing the utility of the wireless channel and the transmission reliability. The PMC proposed in the exemplary embodiment of the present invention is a protocol for efficiently perform the multicast communication between the IEEE 802.11 based devices.

Figure 16:
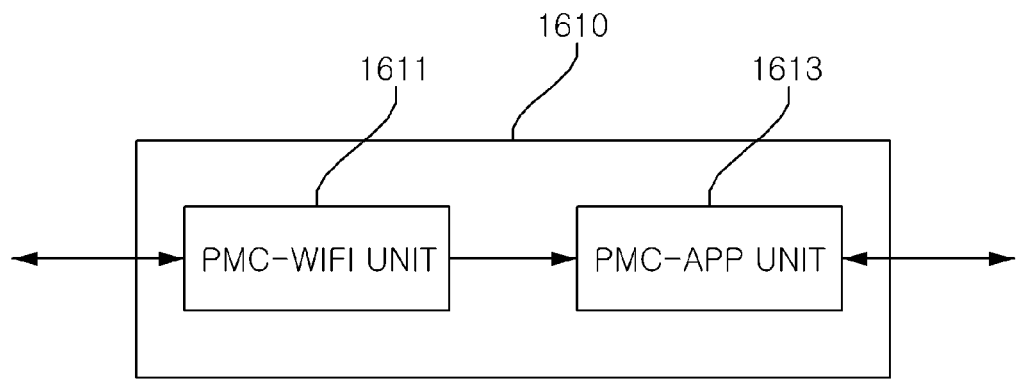
FIG. 16 is a diagram showing a PMC terminal according to the exemplary embodiment of the present invention.

FIG. 16 is a diagram showing a PMC terminal according to the exemplary embodiment of the present invention. As shown in FIG. 16, a PMC terminal 1610 may be a PMC station in FIG. 16. However, for convenience of explanation, the exemplary embodiment of the present invention describes only the PMC terminal 1610. The PMC terminal 1610 includes a PMC-WiFi unit 1611 and a pseudo multicast capability-application (PMC-APP) unit 1613 that is an upper layer controlling the PMC-WiFi unit 1611. The PMC-WiFi unit 1611 includes the MAC and PHY layers and serves to perform the substantial packet transmission and reception. The PMC-APP unit 1613 includes the upper layer of the PMC-WiFi unit 1611 and serves to perform the operation of the PMC protocol.

Meanwhile, the operation mode of the PMC-WiFi unit 1611 includes a basic communication mode and a promiscuous mode. When the destination address of a packet transmitted to the PMC-WiFi unit 1611 is different from its own address in the basic communication mode, the PMC-WiFi unit 1611 does not transmit the packet to the upper layer. The PMC-WiFi unit 1611 in the promiscuous mode transmits all the packets successfully received from the channel to the upper layer. The PMC-APP unit 1613 cooperates with the PMC-APP unit within different PMC terminals on 1-hop to continuously update the inter-terminal channel quality.

Figure 17:
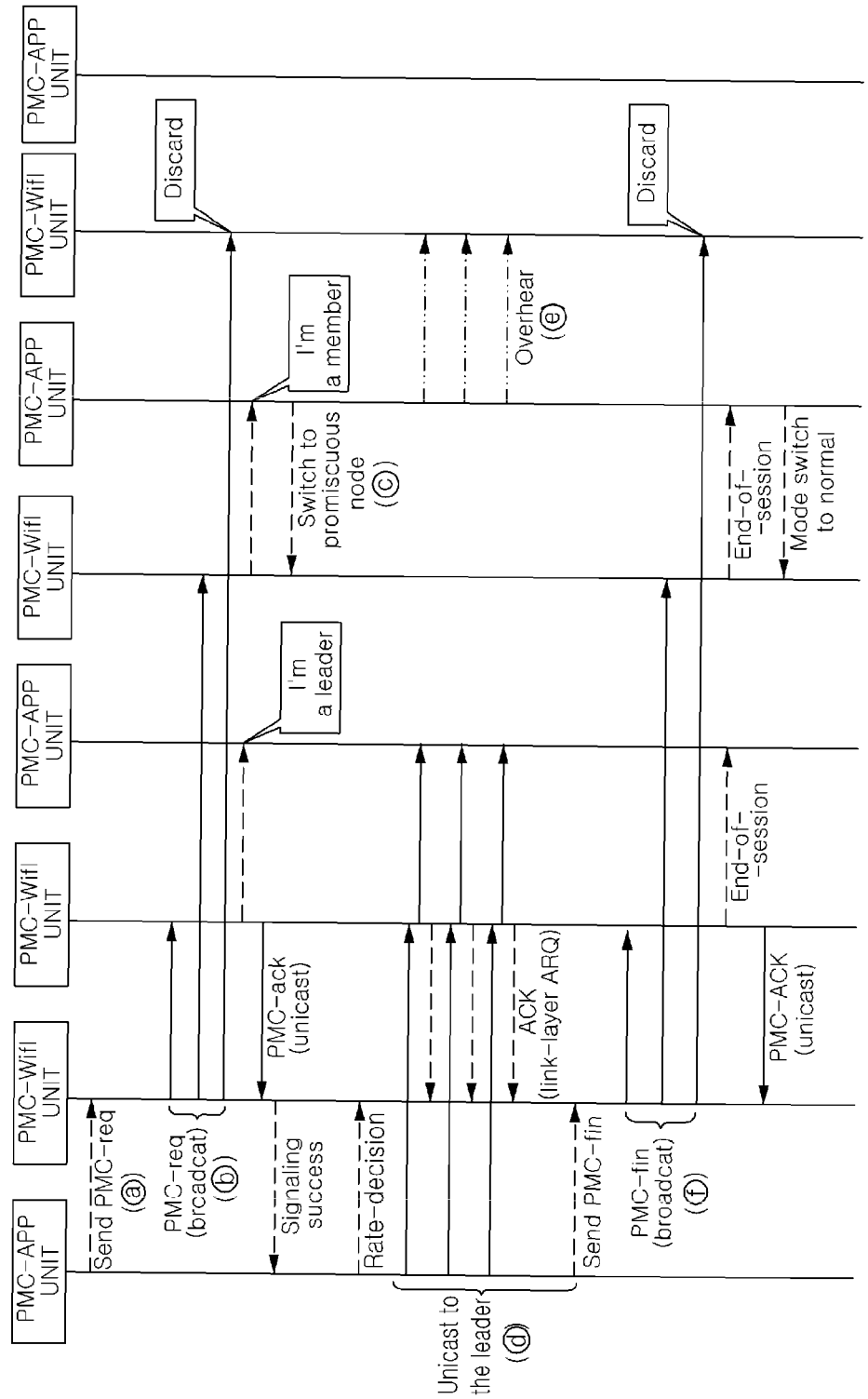
FIG. 17 is a flow chart for describing a multicast session according to the exemplary embodiment of the present invention.

FIG. 17 is a flow chart for describing a multicast session according to the exemplary embodiment of the present invention. As shown in FIG. 17, the multicast cession includes a single PMC-initiator and a plurality of PMC-members.

The PMC-APP unit of the PMC-initiator may request the upper application (a) or start the multicast session of itself (b). The length of the multicast session is defined by the amount of data to be transmitted (the number or size of packets) and time or a combination thereof.

The PMC terminal starting the multicast session becomes the PMC-initiator 1620. When the PMC-initiator broadcasts the PMC-request message (b), the PMC terminals receiving the PMC-request message determine whether the PMPC terminal itself is a PMC-leader or a PMC member. In detail, the PMC terminal determines itself as the PMC member when it is determined that the PMC terminal itself is not the PMC-leader.

A method of determining the PMC-leader may be different according to a kind of applications.

In detail, in order to perform the applications sensitive to the delay, the delay needs to be minimized at the time of retransmitting the link layer. Therefore, the PMC-member having the highest channel quality as compared with the PMC-initiator becomes the PMC-leader. Therefore, the higher transmission success rate for the set maximum supportable transmission rate $R_{max}$ is set.

On the other hand, in order to perform the applications sensitive to the loss, there is a need to sufficiently use the retransmission of the link layer. Therefore, the PMC-member having the lowest channel quality as compared with the PMC-initiator is selected as the PMC-leader. This is to provide the high success rate through the retransmission to the PMC-member having the relatively lower transmission success rate several times.

The PMC-leader cooperates with the PMC-initiator to initialize the multicast session and end. Meanwhile, the PMC-member is a passive participant of the multicast session and sets its own PMC-WiFi unit as the promiscuous mode while the multi-cast session is performed (c). The initially selected PMC-leader in the single multicast session may be changed to the PMC-members before the single multicast session ends.

The PMC-initiator transmits the packet to the PMC-leader in the unicast type for the multicast session (d). The PMC-members operated in the promiscuous mode may receive the PMC-initiator and may receive the communication of the PMC-leader in an overhear manner (e).

Meanwhile, the PMC-WiFi unit of the PMC-initiator performs the rate-adaptation in order to increase the utility of the channel resources at the time of transmitting and receiving the unicast packet. The PMC-initiator selects the maximum multicast transmission rate based on the channel context information with the PMC-member. For example, the lowest channel quality between the PMC-member and the PMC-initiator is calculated and the maximum supportable transmission rate $R_{max}$ for the lowest channel quality is calculated. The PMC-initiator prevents its own PMC-WiFi unit from communicating with the PMC-leader at $R_{max}$ or more at the time of initializing the multicast session.

Meanwhile, the above-mentioned exemplary embodiments of the present invention may be created by computer executable programs and may be implemented by a general purpose digital computer operating the programs using a computer readable recording medium. The computer readable recording medium includes a storage medium such as a magnetic storage medium (for example, ROM, floppy disk, hard disk, or the like), an optical reading medium (for example, CD-ROM, DVD, or the like), and a carrier wave (for example, transmission through Internet).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

EXPLANATION OF REFERENCE NUMERALS

10: WLAN system
12: Station or Terminal
14: Base station
15: Backbone network or Distribution system

The invention claimed is:

1. A method for directly linking stations in an IEEE 802.11 WLAN environment, comprising:
   (a) performing a negotiation for setting a direct link by a wireless channel, a secondary channel other than a basic service set (BSS) channel used for communicating between a station, an access point (AP), and another station, when traffic destined to the other station is generated in the station;
   (b) switching an operation channel of the station from the BSS channel to the secondary channel when the negotiation requires the switching, and the negotiation for setting the direct link by the secondary channel succeeds according to the negotiation performance results;
   (c) transmitting data of the generated traffic to the other station through the secondary channel;
   (d) releasing the direct link setup from the other station when the traffic destined to the AP is generated in the station after step (c);
   (e) switching the operation channel of the station from the secondary channel to the BSS channel;
   (f) transmitting the data of the generated traffic to the AP through the BSS channel; and
   (g) performing a negotiation for setting the direct link by the BSS channel with the other station only in the case in which the traffic destined to the other station is generated at the time when a predetermined time does not lapse from the time when the data are finally transmitted and received to and from the AP after the step (e).

2. The method of claim 1, wherein the step (a) includes:
   transmitting a direct link setup request including information on the secondary channel to the other station via the AP; and
   transmitting an acknowledgment (ACK) to the other station via the AP when the direct link setup response is received via the AP from the other station.

3. The method of claim 1, wherein the step (d) includes:
   transmitting the direct link release request to the other station; and
   receiving the ACK from the other station.

4. The method of claim 1, further comprising: performing the negotiation for setting the direct link by the secondary channel with the other station when the traffic destined to the other station is generated after the predetermined time lapses from the time when the data are finally transmitted and received to and from the AP after the step (e).

5. A communication method in an IEEE 802.11 WLAN environment, comprising:
   (a) performing a negotiation for setting a direct link by a wireless channel, a secondary channel other than a basic service set (BSS) channel used for a first station and a second station communicating with an access point (AP), when traffic destined to the other station is generated in the first station or the second station;
   (b) the first station and the second station switching an operation channel from the BSS channel to the secondary channel when the negotiation for setting the direct link by the secondary channel succeeds according to the negotiation performance results;
   (c) the first station and the second station transmitting data of the generated traffic to the other station through the secondary channel;
   (d) releasing the direct link setup between the first station and the second station from each other when the traffic destined to the AP is generated in the first station or the second station after step (c);

(e) switching the operation channel from the secondary channel to the BSS channel by the station in which the traffic destined to the AP is generated among the first station and the second station;

(f) allowing the station in which the traffic destined to the AP is generated to transmit the generated traffic data to the AP through the BSS channel; and, (g) performing the negotiation for setting the direct link with the other station only by the BSS channel in the case in which the traffic destined to the other station is generated when a predetermined time does not lapse from the time when the data are finally transmitted and received to and from the AP in the station in which the traffic destined to the AP is generated after the step (e).

6. The method of claim 5, further comprising: performing the negotiation for setting the direct link with the other station by the secondary channel when the traffic destined to the other station is generated after the predetermined time lapses from the time when the data are finally transmitted and received to and from the AP in the station in which the traffic destined to the AP is generated after the step (e).

* * * * *